Jan. 16, 1962  A. ELMENDORF  3,017,310

METHOD OF SPLICING VENEER

Filed June 10, 1960

INVENTOR.
Armin Elmendorf,
BY Parker & Carter
Attorneys.

United States Patent Office 3,017,310
Patented Jan. 16, 1962

3,017,310
METHOD OF SPLICING VENEER
Armin Elmendorf, 860 Charleston Road, Palo Alto, Calif.
Filed June 10, 1960, Ser. No. 35,352
6 Claims. (Cl. 156—248)

This invention relates to a method of splicing thin veneers.

One purpose of this invention is a method of splicing veneers thinner than those conventionally used in the manufacture of hardwood plywood and the like.

Another purpose is a method of splicing thin dry veneers on particle boards, hardboard and the like.

Another purpose is a method of splicing veneers, thinner than those conventionally used, which method provides a straight closed joint.

Another purpose is a method of splicing thin veneers in which the veneers are held in place during the splicing operation by first temporarily bonding the veneers to the supporting board at widely spaced points.

Other purposes will appear in the ensuing specification, drawings and claims.

The invention is illustrated diagrammatically in the following drawings.

Figure 1:
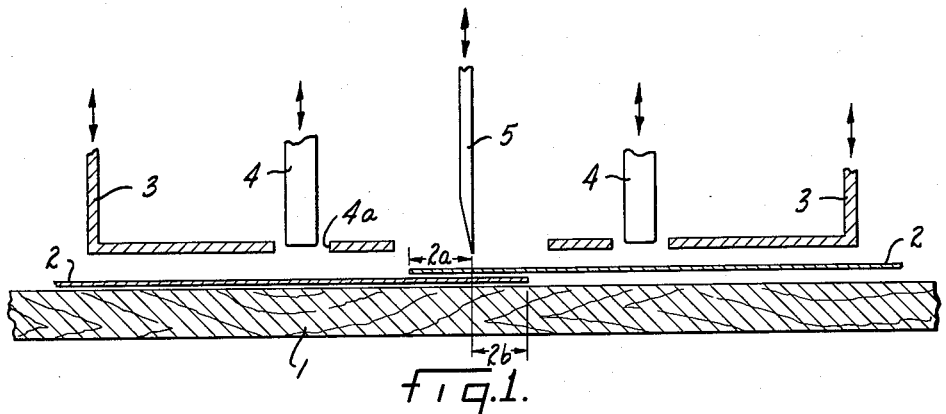
Figure 2:
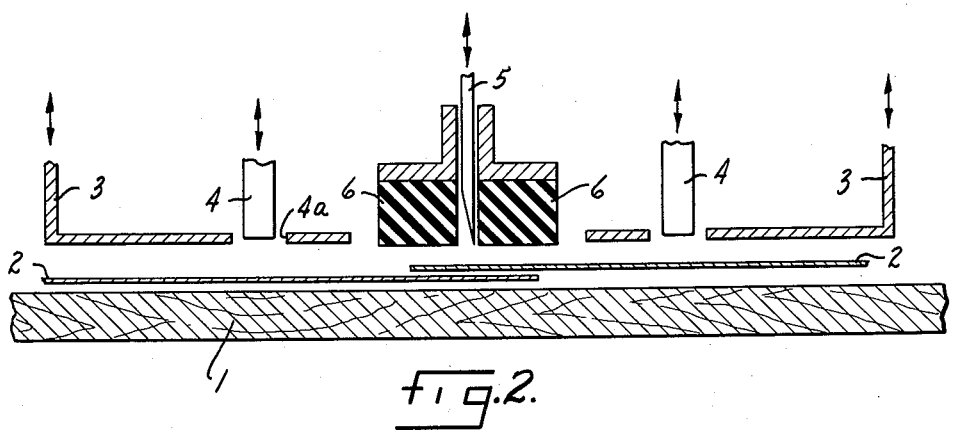
Figure 3:
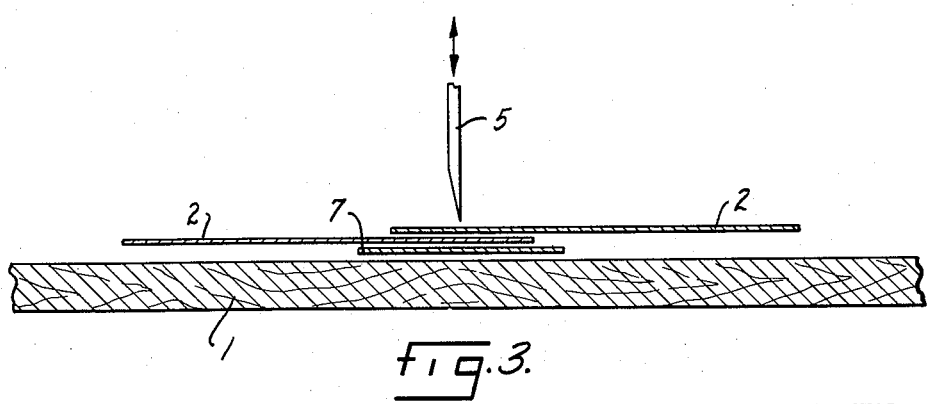

FIGURE 1 is a diagrammatic illustration of one apparatus for practicing my invention, FIGURE 2 is a diagrammatic illustration of a further apparatus for practicing my invention, and FIGURE 3 is a diagrammatic illustration of a modified apparatus for practicing my invention.

In the manufacture of hardwood plywood for the furniture industry and in veneering various substrates such as particle boards, door panels, and hardboard, it is customary to use face veneers of standard thickness; namely, $\frac{1}{28}''$, $\frac{1}{24}''$ and $\frac{1}{20}''$. The entire hardwood plywood industry is organized to use veneers of these thicknesses. While veneers thinner than $\frac{1}{28}''$ have been used experimentally in the manufacture of plywood and in veneering panels, the industry has been thwarted by the many problems associated with their use. The major problem associated with the use of thin veneer has been the difficulty of satisfactorily splicing such veneers. If thin veneer sheets are spliced together, edge-to-edge, with conventional paper tape, such tape shows through the finish if the veneers are placed with the tape "in." If the tape is out, it cannot be removed satisfactorily without revealing a tape groove. Gluing the edges together is difficult with conventional splicing machines and has never been done successfully with very thin veneers, for example, $\frac{1}{64}''$ thick. It has long been recognized that if thin veneers could be quickly and accurately spliced together without tape and without the need for edge-gluing, it would become possible to use such veneers for veneering smooth boards such as hardboards, particle board and various composition boards. By thin veneer we mean veneers thinner than $\frac{1}{28}''$.

Due to the increasing depletion of the hardwood timber resources of the U.S., the plywood industry is becoming increasingly aware of the necessity for reducing the face veneer thickness in order to increase the footage of panels that can be made out of a given log of face-veneer grade. The increasing cost of veneer, therefore, prompts the plywood industry to seek method of utilizing thinner veneers. Process improvement is also being sought to reduce waste. One source of waste is the amount of veneer trimmed off in order to obtain good joints.

The cost of factory labor is also continually increasing so that it has become increasingly important to reduce factory labor, for example by additional mechanization. Stated another way, the veneering industry is now alert to the importance of mechanization and process improvement to reduce factory labor.

The process for splicing thin veneer described herein has evolved out of many years of association with the veneer and plywood industries and familiarity with the problems of these industries. It is aimed at substantially increasing the footage of veneered panels obtainable out of a given log, reducing the waste involved in current veneering practices, and reducing factory labor. Most of the labor cost involved in current veneering practice lies in handling the many sheets of veneer required, in preparing them, and assembling them for press gluing. A sheet of veneer leaving the veneer cutting machine generally remains in the factor for several days of processing before it leaves the plant bonded on a substrate of some kind.

In the process disclosed herein either rotary-cut or sliced veneers may be used. The process lends itself best to the use of hardwood veneers, although other veneers may also be used. In my process, veneers ranging in thickness from about $\frac{1}{50}''$ to $\frac{1}{80}''$ are used; hence, the veneer is generally only one-half as thick as the thinnest veneer used conventionally. For example, in my process we can use $\frac{1}{64}''$ green veneer. The entire process from carrying the veneer from the slicing machine to the removal of a completed panel ready for sanding may require only two minutes. During this time the veneer is dried, the sheets are spliced together, edge-to-edge, and bonded to a substrate such as hardboard, particle board, or composition board. I may dry the veneer under constraint in the press simultaneously with bonding, or I may dry the veneer sheets independently and then splice and bond them.

By splicing, I mean trimming the edges of the veneer to a sharp, straight line, then bringing the edges together and holding them together while the veneer is being bonded to a substrate in a hot-plate press. The joints in the veneer faces must be suitable for furniture panels and must, therefore, be accurately made.

Co-pending United States patent applications Serial Numbers 816,413, filed May 28, 1959, and 828,243, filed July 20, 1959, now abandoned, relate to a method of splicing thin veneers in their green state. In the former application, green veneer sheets are held in position on the substrate to which they are to be bonded, by means of a film of water between the veneer and the panel while the joint is being made and the panel is being handled into the press. In the latter application, the green veneer sheets are temporarily bonded over the entire area while the joint is being made and the panel is being transported to and into the press. In the press the veneers are dried under constraint and bonded permanently to the substrate. In the present invention, I may use thin dry veneer as well as green veneer.

In the above applications, I temporarily bond or hold thin green veneer in position on the substrate by first pressing in one position, after which the assembly is transferred to another position for splicing. In the improved method disclosed herein, I perform all of the operations involved; namely, positioning by temporarily bonding and then splicing, in a sequence of steps, all of which are performed in one position. I thereby eliminate a handling step which may cause veneer displacement.

In FIGURE 1, 1 is a board or substrate, such as hardboard or particle board, which is to be veneered on one or both surfaces. This board has been coated on the side to be veneered with an adhesive of a type which when dry can be activated and rendered tacky by steam and which in the tacky state will temporarily hold green or dry veneer in position. In my process the steam necessary is generally derived from the veneer, where the moisture converted into steam may exist either as hygroscopic moisture or as free moisture.

I have found that some adhesives function satisfactorily only when hygroscopic moisture is used. This means that the moisture content of the veneer must be below about 25%; that is, below the so-called fibre saturation point of wood. Dry veneer which is in equilibrium with the prevailing atmospheric humidity generally contains from 5% to 10% moisture, based upon its oven-dry weight, all of which is hygroscopic. Such veneer provides all the steam required for plasticizing certain adhesives when subjected to temperatures above 212° F. For example, bone glue when dry is rendered tacky by the water vapor generated in dry veneer heated between plates at 212° F. or above. Certain synthetic resin adhesives, such as some phenolic resin adhesives, are also rendered tacky in the presence of steam in the amount generated by the hygroscopic moisture of thin veneer. They are, therefore, satisfactory for use in my process when using dry veneer, but they are not satisfactory when used with thin green veneer. With the latter the steam generated by the free water is in excess of that desired, and the adhesive which is dry to start with is liquified to such an extent that it passes into the veneer or the substrate and both the temporary and the permanent bonds are unsatisfactory. Other adhesives function satisfactorily in the presence of the small amount of steam generated in dry veneer by hygroscopic moisture as well as in the presence of the large amounts of steam generated by the free moisture in green veneer. Among these are casein-latex adhesives, some synthetic rubber formulations and protein adhesives of the soya-meal type.

In my improved process for splicing thin veneer, I apply a coat of a suitable adhesive on the substrate, the choice of adhesive being determined by the moisture content of the veneer, whether hygroscopic or free, and I allow the adhesive to dry. The veneer sheets are then placed on the adhesive-coated substrate with the edge of one sheet lapping over the edge of the adjacent sheet. Thin veneers are generally buckled or warped to some extent. This is particularly true of dry thin veneer. I have found that in order to obtain a joint, closed throughout its length, and free of lapped edges, it is necessary to flatten the veneer sheets and to hold them in the flattened position while the joint is being made. After flattening the veneer, I bond the two sheets temporarily to the substrate at widely separated points or along lines on either side of the lap to prevent shrinkage during the time interval between completing the joint and hot pressing for permanent gluing. Before releasing the flattening pressure the veneer sheets must be held in position by the adhesive which is made tacky by the steam generated at the hot points, and the veneers must be severed at the lap. I cut through the two thicknesses of the veneer with a guillotine knife and if the substrate is soft or weak, as in paper-faced gypsum boards or in soft fiber boards of the insulation board type, I place a thin flexible strip, preferably metal, between the veneer and the substrate at the lap to serve as an anvil to prevent cutting into the fiber surface. The strips of veneer severed off are then removed as well as the anvil strip when used, which may be done while the assembly is on its way to the hot press for permanent gluing.

I have found that the veneer sheets are held in position by the tackiness generated in the adhesive when steam from the veneer passes into the adhesive at the hot points, and that the grip of the adhesive is adequate to prevent shifting and consequently opening of the joint on the way to the hot press for permanent gluing. For temporary spot gluing, steam is necessary in all cases. This may be generated from hygroscopic moisture in the veneer or from free moisture in the veneer or from free moisture on the surface of the adhesive. The adhesive may be lightly moistened to obtain the latter, but steam from the veneer is preferred because it eliminates the need for dampening.

In FIGURE 1, 2 indicates two sheets of thin veneer that have been placed on the base panel or substrate 1 so that an edge of each sheet laps over the edge of the adjacent sheet. A hold-down plate 3 is lowered so as to rest on each veneer sheet to flatten the same, experience having shown that thin hardwood veneers are almost always buckled or warped. This is especially true when the veneers are dry.

The widely separated hot points previously described are indicated at 4. They may pass through holes 4a in the hold-down plates 3. The hot points may be several inches apart and they may be spaced in any manner to effectuate a temporary bond between this veneer and the substrate. The hot points 4 may be in the form of short lengths of bars with a narrow edge, but spaced round points are preferred in order to minimize shrinkage across the grain. I have found that any shrinkage that may occur under the hot points does not open the joint. The point of contact of the hot points may be the end of a rod or it may be in the form of a hot ring. Heat may be applied from any source such as electricity or steam, the means for heating not being a part of this invention.

After the hold-down plates have flattened the veneer, the hot points 4 used for temporary spot gluing, are brought down to press on the veneer and to force it into intimate contact with the dry adhesive, on the substrate. When a casein-latex adhesive is used and the veneer is dry, spot bonding is obtained in this manner in a few seconds. While the spot gluing holds the veneer sheets in position, the bond can be readily broken by manually lifting the veneer and peeling it off. Permanent bonding results from subsequent pressing in a hot-plate press.

Before lifting the hold-down plates 3, a knife 5 is brought down to shear through the two thicknesses of veneer at the lap. After severing the veneer, the hot points and the hold-down plates 3 are lifted. The veneer sheets are held in position by the temporary bonds and remain in position while the panel is being transferred to the hot-plate press for permanent bonding.

After cutting through the veneer at the lap, the two strips of veneer 2a and 2b that have been severed from the edges at the lap, are pulled away. The panel is then transferred to the hot-plate press where it is subjected to heat and pressure, as in conventional plywood manufacture. If green veneer is used, the press may be provided with a ventilating caul, as described in the above mentioned copending applications. The veneer is firmly bonded and no displacement takes place at the joint so that a tight, perfect joint is obtained throughout the length of the cut even when the veneer is green to start wtih.

FIGURE 2 shows a further modification of my process. The guillotine knife 5 may be provided with two spaced cushions 6, made of soft rubber or its equivalent. These cushions serve as hold-downs to flatten the veneer immediately adjacent the knife, the cutting action being similar to that used in die-cutting. After the cushions have been brought into contact with the veneer and have been compressed slightly, the edge of the knife descends further until it passes through the two thicknesses of veneer.

In the operation shown diagrammatically in FIGURE 2, the veneer is first flattened by the hold-down plates. The hot points, which may be activated by spring pressure, are then brought down to temporarily bond or spot glue the veneer to the substrate at spaced points. The guillotine knife with the spaced cushions 6 then descends. The cushions hold the veneer flat at the lap while the knife shears through the two thicknesses of veneer. To complete the cycle of operation, the knife and cushion are first withdrawn. The withdrawal of the hot points and the flattening plates proceeds in the reverse order in which they were brought down. The veneer strips that have been severed away from the edges are then removed, after which the assembly is transferred to a hot-plate press where it is pressed by conventional procedure using pressures and temperatures customary for the particular adhesive used. The resultant joint is accurately and tightly made throughout its length.

When veneering with 1/64" green veneer and bonding the same in a hot-plate press in the presence of a ventilating caul, such as a fine wire screen, I have found that the veneer can be dried and bonded in from 1 to 1½ minutes. The panel removed from the press may be sanded immediately although good practice requires cooling before sanding.

In the process illustrated diagrammatically in FIGURES 1 and 2 the substrate is a relatively firm and hard board, such as a particle board, hardboard, or plywood. All of these boards offer resistance to penetration of the knife edge so that a sharp, clean cut is obtained with the substrate serving as the anvil block. No damage is done to the substrate by the edge of the knife. If, however, the substrate is a soft, fibrous board or a board faced with soft, fibrous sheets, such as the paper facing of gypsum board, and the knife penetrates this soft surface, the strength of the substrate may be affected. In that case, I insert a thin hard strip, such as a piece of spring brass, as illustrated at 7 in FIGURE 3. The knife edge comes in contact with this anvil strip and no injury is done to the substrate. The strip is removed when the veneer trim is removed. I have found that a good joint can be obtained in this manner, even though the substrate be soft.

In the improved process described, the substrate is first coated with an adhesive of the type which can be rendered tacky by steam. The adhesive coat is then allowed to dry. The veneers are placed on the adhesive with their edges lapped, after which they are flattened by light plate pressure. They are then temporarily bonded to hold them in position, using steam to activate the adhesive. The lapped edges are sheared with a straight knife in one cut through the two thicknesses of lapped veneer. The strips of veneer that have been sheared off are then removed, after which the sheets of veneer are permanently bonded over the entire area in a hot-plate press. The drawings diagrammatically illustrate apparatus for performing my improved method. The details of the apparatus are not a part of the invention and may be varied considerably.

Whereas the preferred form of the invention has been shown and described herein, it should be realized that there are many modifications, substitutions and alterations thereto within the scope of the following claims.

I claim:
1. A method of splicing thin veneer including the steps of coating a board with an adhesive of the type which in the dry condition can be activated by steam, allowing the adhesive to dry, placing two sheets of thin veneer on the adhesive coated board with an edge of one sheet overlapping an edge of the other, applying pressure to said veneer sheets over a large part of their areas to flatten the veneer, temporarily bonding each sheet of veneer to the board at small widely spaced points by activating the adhesive at said points with steam, shearing through the veneer at the lap, then removing the severed strips of veneer and thereafter pressing the veneer and board in a hot-plate press to permanently bond the veneer over the entire area.

2. The method of splicing thin veneer including the steps of coating a board with an adhesive of the type which in the dry condition can be activated by steam, allowing the adhesive to dry, placing two sheets of veneer on the adhesive-coated board with an edge of one sheet overlapping an edge of the other, flattening the veneer, temporarily bonding the veneer at spaced small points by activating the adhesive with steam generated at said points to thereby hold the veneer in the flattened position, cutting through the veneer at the lap, then removing the strips of veneer severed from the edges at the lap and thereafter pressing the veneer and board in a hot-plate press to permanently bond the veneer over an entire area.

3. The method of claim 2 wherein the moisture content of the veneer is below the fiber saturation point and the steam formed at the pressure points is derived from hygroscopic moisture in the veneer.

4. The method of claim 3 characterized by the further step of dampening the dry adhesive prior to placing the veneer thereon.

5. The method of claim 2 characterized by the further step of applying pressure to the veneers at the lap during the shearing of said veneer.

6. The method of claim 2 wherein the veneer is temporarily bonded to the board adjacent each edge of the lap.

References Cited in the file of this patent

UNITED STATES PATENTS

| | | |
|---|---|---|
| 1,883,616 | Dike | Oct. 18, 1932 |
| 2,556,476 | Lamport | June 12, 1951 |